(12) United States Patent
Tong et al.

(10) Patent No.: US 8,295,343 B2
(45) Date of Patent: Oct. 23, 2012

(54) VIDEO BIT RATE CONTROL METHOD

(75) Inventors: Xin Tong, Mountain View, CA (US); Barin Geoffry Haskell, Mountain View, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1641 days.

(21) Appl. No.: 11/473,248

(22) Filed: Jun. 23, 2006

(65) Prior Publication Data

US 2007/0116115 A1    May 24, 2007

Related U.S. Application Data

(60) Provisional application No. 60/737,801, filed on Nov. 18, 2005.

(51) Int. Cl.
*H04N 7/12* (2006.01)

(52) U.S. Cl. ......... 375/240.03; 375/240.04; 375/240.05; 382/239

(58) Field of Classification Search ............. 375/240.03, 375/240.04, 240.05; 382/239
See application file for complete search history.

(56) References Cited

U.S. PATENT DOCUMENTS

| | | | |
|---|---|---|---|
| 3,716,851 A | 2/1973 | Neumann | |
| 4,023,110 A | 5/1977 | Oliver | |
| 4,131,765 A | 12/1978 | Kahn | |
| 4,217,609 A | 8/1980 | Hatori et al. | |
| 4,394,774 A | 7/1983 | Widergren et al. | |
| 4,437,119 A | 3/1984 | Matsumoto et al. | |
| 4,670,851 A | 6/1987 | Murakami et al. | |
| 4,698,672 A | 10/1987 | Chen et al. | |
| 4,760,446 A | 7/1988 | Ninomiya et al. | |
| 4,837,618 A | 6/1989 | Hatori et al. | |
| 4,864,393 A | 9/1989 | Harradine | |
| 4,901,075 A | 2/1990 | Vogel | |
| 5,010,401 A | 4/1991 | Murakami et al. | |
| 5,021,879 A | 6/1991 | Vogel | |
| 5,068,724 A | 11/1991 | Krause et al. | |
| 5,091,782 A | 2/1992 | Krause et al. | |
| 5,093,720 A | 3/1992 | Krause et al. | |
| 5,113,255 A | 5/1992 | Nagata et al. | |
| 5,168,375 A | 12/1992 | Reisch et al. | |
| 5,175,618 A | 12/1992 | Ueda et al. | |
| 5,223,949 A | 6/1993 | Honjo | |
| 5,260,783 A | 11/1993 | Dixit | |
| 5,293,229 A | 3/1994 | Iu | |
| 5,298,991 A | 3/1994 | Yagasaki et al. | |

(Continued)

OTHER PUBLICATIONS

Puri & Chen, editors, Multimedia Systems, Standards, and Networks, Chapter 3, pp. 55-64, Marcel Dekker, Inc., New York, 2000.

(Continued)

*Primary Examiner* — Sath V Perungavoor
*Assistant Examiner* — James Pontius
(74) *Attorney, Agent, or Firm* — Kenyon & Kenyon LLP

(57) ABSTRACT

This invention is directed to a video bit rate control method for encoding a video sequence based on a decoder buffer condition and a group of picture (GOP) size limitation of the encoded video sequence. The method includes iteratively adjusting a quantization parameter and/or a masking strength parameter and encoding the video sequence at the adjusted parameters until the buffer condition and GOP size limitation are satisfied. The method makes the above adjustments to avoid buffer underflow and GOP oversizing.

21 Claims, 3 Drawing Sheets

U.S. PATENT DOCUMENTS

| | | | |
|---|---|---|---|
| 5,317,397 A | 5/1994 | Odaka et al. | |
| 5,329,318 A | 7/1994 | Keith | |
| 5,343,248 A | 8/1994 | Fujinami | |
| 5,377,051 A | 12/1994 | Lane et al. | |
| 5,412,430 A | 5/1995 | Nagata | |
| RE34,965 E | 6/1995 | Sugiyama | |
| 5,428,396 A | 6/1995 | Yagasaki et al. | |
| RE35,093 E | 11/1995 | Wang et al. | |
| 5,469,208 A | 11/1995 | Dea | |
| 5,469,212 A | 11/1995 | Lee | |
| RE35,158 E | 2/1996 | Sugiyama | |
| 5,497,239 A | 3/1996 | Kwon | |
| 5,510,840 A | 4/1996 | Yonemitsu et al. | |
| 5,539,466 A | 7/1996 | Igarashi et al. | |
| 5,543,843 A | 8/1996 | Kato | |
| 5,543,847 A | 8/1996 | Kato | |
| 5,557,330 A | 9/1996 | Astle | |
| 5,557,684 A | 9/1996 | Wang et al. | |
| 5,559,557 A | 9/1996 | Kato | |
| 5,565,920 A | 10/1996 | Lee et al. | |
| 5,568,200 A | 10/1996 | Pearlstein et al. | |
| 5,587,806 A | 12/1996 | Yamada et al. | |
| 5,625,355 A | 4/1997 | Takeuo et al. | |
| 5,648,733 A | 7/1997 | Worrell et al. | |
| 5,654,706 A | 8/1997 | Jeong | |
| 5,666,461 A | 9/1997 | Igarashi et al. | |
| 5,684,534 A | 11/1997 | Harney et al. | |
| 5,703,646 A | 12/1997 | Oda | |
| 5,711,012 A | 1/1998 | Bottoms et al. | |
| 5,719,986 A | 2/1998 | Kato et al. | |
| 5,831,688 A | 11/1998 | Yamada et al. | |
| 5,841,939 A | 11/1998 | Takahashi et al. | |
| 5,852,664 A | 12/1998 | Iverson et al. | |
| 5,887,111 A | 3/1999 | Takahashi et al. | |
| 5,917,954 A | 6/1999 | Girod et al. | |
| 5,929,916 A * | 7/1999 | Legall et al. | 375/240.05 |
| 5,946,043 A | 8/1999 | Lee et al. | |
| 5,949,948 A | 9/1999 | Krause et al. | |
| 5,991,447 A | 11/1999 | Eifrig et al. | |
| 5,991,503 A | 11/1999 | Miyasaka et al. | |
| 6,052,507 A | 4/2000 | Niida et al. | |
| 6,064,776 A | 5/2000 | Kikuchi et al. | |
| 6,081,296 A | 6/2000 | Fukunaga et al. | |
| 6,081,551 A | 6/2000 | Etoh | |
| RE36,761 E | 7/2000 | Fujiwara | |
| 6,088,391 A | 7/2000 | Auld et al. | |
| 6,115,070 A | 9/2000 | Song et al. | |
| 6,125,146 A | 9/2000 | Frencken et al. | |
| 6,141,383 A | 10/2000 | Yu | |
| 6,144,698 A | 11/2000 | Poon et al. | |
| 6,167,087 A | 12/2000 | Kato | |
| 6,169,821 B1 | 1/2001 | Fukunaga et al. | |
| 6,188,725 B1 | 2/2001 | Sugiyama | |
| 6,217,234 B1 | 4/2001 | Dewar et al. | |
| 6,256,420 B1 | 7/2001 | Sako et al. | |
| 6,563,549 B1 | 5/2003 | Sethuraman | |
| 6,591,016 B2 * | 7/2003 | Fert et al. | 382/239 |
| 6,873,654 B1 * | 3/2005 | Rackett | 375/240.03 |
| 7,409,097 B2 * | 8/2008 | Zhang et al. | 382/239 |
| 7,535,959 B2 * | 5/2009 | Lightstone et al. | 375/240.04 |
| 2002/0168012 A1 * | 11/2002 | Ramaswamy | 375/240.29 |
| 2003/0123552 A1 | 7/2003 | Prakash et al. | |
| 2004/0233995 A1 | 11/2004 | Abe et al. | |
| 2005/0286631 A1 | 12/2005 | Wu et al. | |
| 2006/0013298 A1 | 1/2006 | Tong et al. | |

OTHER PUBLICATIONS

"Coding of Moving Pictures and Associated Audio Information", ISO/JEC JTC1/SC29WG11 Video Group, Feb. 1996.

Haskell, Barry G.; Puri, Atul; and Netravali, Arun N.; "Digital Video: An Introduction to MPEG-2", Digital Multimedia Standards Series, pp. 33-54, 80-182, 369-411.

Mitchell, Joan.; Pennebaker, William B.; Fogg, Chad E.; and LeGall, Didier J.; "MPEG Video Compression Standard" Digital Multimedia Standards Series, pp. 17-32 and 81-103, 333-356.

Zhihai He, Y.K. Kim, and S.K. Mitra, "Low-delay rate control for DCT video coding via $\rho$-domain source modeling," IEEE Trans. on Circuits and Systems for Video Technology, Aug. 2001, vol. 11, No. 8.

Zhihai He and S.K. Mitra, "Optimum bit allocation and accurate rate control for video coding via $\rho$-domain source modeling," IEEE Trans. on Circuits and Systems for Video Technology, Oct. 2002, pp. 840-849, vol. 12, No. 10.

Zhihai He and S.K. Mitra, "A unified rate-distortion analysis framework for transform coding," IEEE Trans. on Circuits and Systems for Video Technology, Dec. 2001, pp. 1221-1236, vol. 11, No. 12.

Wei Ding, "Joint encoder and channel rate control of VBR video over ATM networks," IEEE Trans. on Circuits and Systems for Video Technology, Apr. 1996, pp. 266-278, vol. 7, No. 2.

Wei Ding and B. Liu, "Rate control of MPEG video coding and recoding by Rate-Quantization modeling," IEEE Trans. on Circuits and Systems for Video Technology, Feb. 1996, pp. 12-20, vol. 6, No. 1.

I-Ming Pao and Ming-Ting Sun, "Encoding stored video for streaming applications," IEEE Trans. on Circuits and Systems for Video Technology, Feb. 2001, pp. 199-209, vol. 11, No. 2.

Jordi Ribas-Corbera and S.-M. Lei, "A frame-layer bit allocation for H.263+," IEEE Trans. on Circuits and Systems for Video Technology, Oct. 2000, pp. 1154-1158, vol. 10, No. 7.

Yan Yang and S.S. Hemami, "Rate control for VBR video over ATM: Simplification and implementation," IEEE Trans. on Circuits and Systems for Video Technology, Nov. 2001, pp. 1045-1058, vol. 11, No. 9.

Supavadee Aramvith, I.-M. Pao, and M.-T. Sun, "A rate-control for video transport over wireless channels," IEEE Trans. on Circuits and Systems for Video Technology, May 2001, pp. 569-580, vol. 11, No. 5.

I-Ming Pao and M.-T. Sun, "Encoding stored video for streaming applications," IEEE Trans. on Circuits and Systems for Video Technology, Feb. 2001, pp. 199-209, vol. 11, No. 2.

Lilla Boroczky, A.Y. Ngai, and E.F. Westerman, "Joint rate-control with look-ahead for multi-program video coding," IEEE Trans. on Circuits and Systems for Video Technology, Oct. 2000, pp. 1159-1163, vol. 10, No. 7.

Jordin Ribas-Corbera and S. Lei, "Rate control in DCT video coding for low-delay communications," IEEE Trans. on Circuits and Systems for Video Technology, Feb. 1999, pp. 172-185, vol. 9, No. 1.

Po-Yuen Cheng, J. Li, and C.-C.J. Kuo, "Rate control for and embedded wavelet video coder," IEEE Trans. on Circuits and Systems for Video Technology, Aug. 1997, pp. 696-702, vol. 7, No. 4.

Kuo-Chin Fan and K.-S. Kan, "An active scene analysis-based approach for pseudoconstant bit-rate video coding," IEEE Trans. on Circuits and Systems for Video Technology, Apr. 1998, pp. 159-170, vol. 8, No. 2.

Ashish Jagmohan and K. Ratakonda, "MPEG-4 one-pass VBR rate control for digital storage," IEEE Trans. on Circuits and Systems for Video Technology, May 2003, pp. 447-452, vol. 13, No. 5.

Anthony Vetro, H. Sun, and Y. Wang, "MPEC-4 rate control for multiple object coding," IEEE Trans. on Circuits and Systems for Video Technology, Feb. 1999, pp. 186-199, vol. 9, No. 1.

Jose I. Ronda, F. Jaureguizar, and N. Garcia, "Rate control and bit allocation for MPEG-4," IEEE Trans. on Circuits and Systems for Video Technology, Dec. 1999, pp. 1243-1258, vol. 9, No. 8.

Hung-Ju Lee, T. Chiang, and Y.-Q. Zhang, "Scalable rate control for MPEG-4 video," IEEE Trans. on Circuits and Systems for Video Technology, Sep. 2000, pp. 878-894, vol. 10, No. 6.

Feng Pan, Z. Li, K. Lim, and G. Feng, "A study of MEPG-4 rate control scheme and its improvements," IEEE Trans. on Circuits and Systems for Video Technology, May 2003, pp. 440-446, vol. 13, No. 5.

Jeong-Woo Lee, A. Vetro, Y. Wang, and Y.-S. Ho, "Bit allocation for MPEG-4 video coding with spatio-temporal tradeoffs," IEEE Trans. on Circuits and Systems for Video Technology, Jun. 2003, pp. 488-502, vol. 13, No. 6.

Ghanbari, Standard Codecs: Image Compression to Advanced Video Coding, pp. 155-156, The Institute of Electrical Engineers, London, UK, Jul. 2003.

* cited by examiner

US 8,295,343 B2

VIDEO BIT RATE CONTROL METHOD

RELATED APPLICATION

This application claims priority under 35 U.S.C. 119(e) to U.S. Provisional Application No. 60/737,801, filed Nov. 18, 2005, the contents of which are hereby incorporated by reference.

BACKGROUND

There are several constraints on the video bit rate of a sequence coded on a DVD, e.g., device processing capacity, read rate, and seek time. The problem has been how to meet these constraints, yet provide acceptable video quality and DVD performance.

One approach has been to apply a rate control algorithm based on MPEG-2 TM5 to video sequences. However, this algorithm does not handle frame complexity changes due to scene changes very well, failing to allocate bits proportionately and timely with the scene changes. A two-pass version of this algorithm has been implemented to react more rapidly to the scene changes. However, there is an initial learning period after each scene change in which the algorithm must determine the appropriate bit allocation. Moreover, the rate control algorithm does not adequately model decoder buffer conditions, such that the determined bit rate may result in buffer underflow.

Accordingly, there is a need in the art for an efficient way to control the video bit rate within the above-mentioned constraints and provide acceptable video quality and DVD performance.

DETAILED DESCRIPTION

Figure 1:
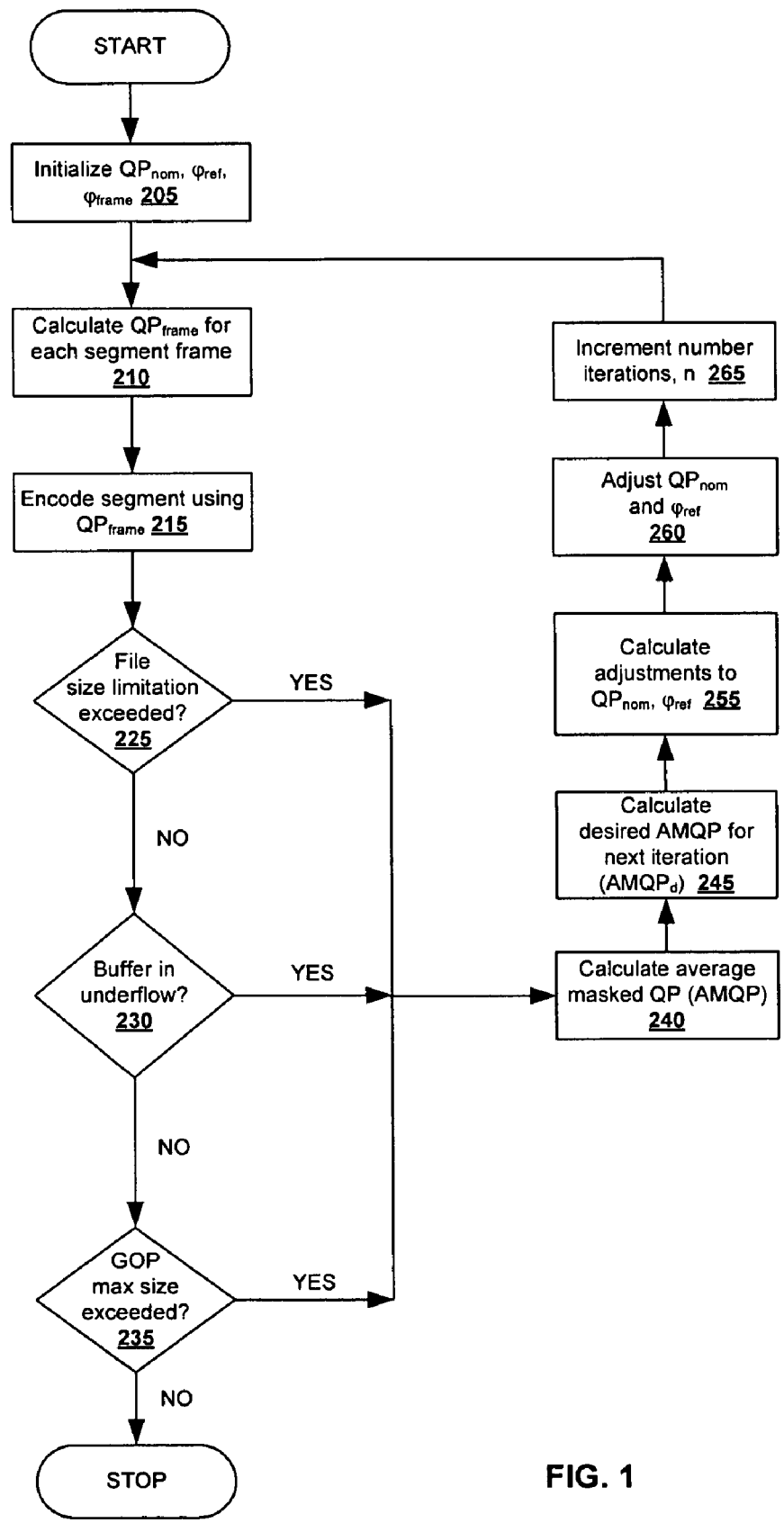
FIG. 1 is a flowchart of a method according to an embodiment of the present invention for controlling video bit rates of a video sequence.

The following terms are used throughout this description with respect to the methods for controlling video bit rates according to embodiments of the present invention.

Nominal quantization parameter $QP_{nom}$ refers to a reference value for the quantization parameters that may be used for encoding the frames within the video sequence. A quantization parameter defines the granularity with which a video frame within a sequence may be coded. The value of $QP_{nom}$ may be adjusted during each iteration of a method according to embodiments of the present invention in order to reach a target video bit rate for the encoded video sequence.

Reference masking strength parameter $\phi_{ref}$ refers to a reference measure of the visual activity of the frames within the video sequence. The value of $\phi_{ref}$ may be adjusted during each iteration to reach a target video bit rate for the encoded video sequence.

Frame masking strength parameter $\phi_{frame}$ refers to a measure of the visual activity of a particular frame within the video sequence. A frame's value of $\phi_{frame}$ may be used to calculate that frame's quantization parameter during each iteration to be used to allocate bits for the encoded frame.

Frame quantization parameter $QP_{frame}$ refers to the quantization parameter calculated for a particular frame. A frame's value of $QP_{frame}$ may be calculated based on the nominal quantization parameter $QP_{nom}$ and the reference and frame masking strength parameters $\phi_{ref}$, $\phi_{frame}$ during each iteration to be used to allocate bits for that encoded frame.

Average masking quantization parameter AMQP refers to an average of the frame quantization parameters $QP_{frame}$. The value of AMQP may be compared to the nominal quantization parameter $QP_{nom}$ during each iteration to determine how the nominal quantization parameter $QP_{nom}$ and the reference masking strength parameter $\phi_{ref}$ should be adjusted to reach a target video bit rate for the encoded video sequence.

A segment of a video sequence refers to a group of contiguous video frames in the sequence in display order. In embodiments of the present invention, a video sequence may be partitioned into segments and coded on a segment-by-segment basis.

Embodiments of the present invention provide a method for controlling the video bit rate of segments of a video sequence by adjusting a nominal quantization parameter $QP_{nom}$ and a reference masking strength parameter $\phi_{ref}$ in order to reach a target bit rate, while avoiding sequence file oversizing, decoder buffer underflow, and coded group of picture (GOP) oversizing. This advantageously results in acceptable video quality and DVD performance within the constraints of the DVD device, such as device processing capacity, read rate, and seek time.

Related U.S. Patent Publication No. 2005-0286631 describes a method for controlling the video bit rate. Related U.S. Patent Publication No. 2006-0013298 describes a masking strength parameter.

FIG. 1 is a flowchart of an iterative method according to an embodiment of the present invention for controlling video bit rates per video segment. For each segment, the encoder may iteratively adjust the nominal quantization parameter and/or the reference masking strength parameter to provide a target video bit rate for that segment within the DVD performance constraints.

The encoder may initialize (205) the nominal quantization parameter $QP_{nom}$, the reference masking strength parameter $\phi_{ref}$, and the frame masking strength parameter $\phi_{frame}$ by setting $QP_{nom}$ and $\phi_{ref}$ to initial values by any known parameter initialization method and by measuring an initial value for $\phi_{frame}$. The initial values may be arbitrary values or values selected based on experimental results that are known to produce acceptable video quality at the target bit rate.

The encoder may calculate (210) each segment frame's quantization parameter $QP_{frame}$ based on $QP_{nom}$ and the difference between $\phi_{ref}$ and $\phi_{frame}$. For example, if the frame's masking strength parameter $\phi_{frame}$ is higher than the reference masking strength parameter $\phi_{ref}$, then the frame may have higher visual activity or lower sensitivity to visual artifacts in the frame, such that the calculated quantization parameter $QP_{frame}$ should have a higher value than the nominal quantization parameter $QP_{nom}$ to provide a lower bit rate for the frame. Conversely, if $\phi_{frame}$ is lower than $\phi_{ref}$, then the frame may have lower visual activity or higher sensitivity to visual artifacts in the frame, such that $QP_{frame}$ should have a lower value than $QP_{nom}$ to provide a higher bit rate for the frame.

The encoder may then encode (215) the segment frames using respective calculated frame quantization parameters $QP_{frame}$'s. The encoder may use any known coding technique to encode the segment.

After the segment has been encoded, the encoder may check whether any of three undesirable conditions—sequence file oversizing, decoder buffer underflow, or GOP oversizing—has occurred as a result of the encoding. In which case, re-encoding with adjusted coding parameters may be done to reach the target bit rate while correcting these undesirable conditions. In FIG. 1, all three conditions are checked. However, it is to be understood that any one or more of these conditions may be checked in any order during an iteration according to embodiments of the present invention. It is further to be understood that embodiments are not limited to checking for these three conditions, but may check for any other conditions that may adversely affect coding.

The encoder may determine (225) whether the encoded segment causes the file size (or, equivalently, bit rate) limitation that was set for the entire video sequence to be exceeded. If the file size limitation is exceeded (225), the encoder may calculate (240) the average masked quantization parameter AMQP, which is the mathematical average of the segment frames' calculated quantization parameters $QP_{frame}$. Alternatively, the AMQP may be the median of the $QP_{frame}$'s or any other appropriate value in accordance with embodiments of the present invention.

The AMQP is directly related to the bit rate, where an increase in the AMQP generally decreases the bit rate and a decrease in the AMQP generally increases the bit rate. Such a relationship between the bit rate and the AMQP may form the basis of the desired AMQP calculation, described below.

The encoder may calculate (245) the desired average masked quantization parameter $AMQP_d$, which is the AMQP to be reached in the next iteration in an attempt to achieve the target bit rate. In one embodiment, the $AMQP_d$ for iteration i+1 may be extrapolated from the AMQP in iteration i based on the target bit rate versus the actual bit rate achieved in iteration i. In an alternate embodiment, the $AMQP_d$ for iteration i+1 may be interpolated from the AMQP's and corresponding actual bit rates of any two or more previous iterations in which the actual bit rates were closest to the target bit rate. In another alternate embodiment, the $AMQP_d$ for iteration i+1 may be approximated from a higher order polynomial relationship between AMQP and bit rate using the AMQP's and corresponding actual bit rates from any two or more previous iterations. Other such calculations may be used to find $AMQP_d$ for the next iteration.

The encoder may then calculate (255) the adjustments to be made to $QP_{nom}$ and $\phi_{ref}$ in order to reach the $QP_{nom}$ and $\phi_{ref}$ that may give an AMQP value close to $AMQP_d$, for example, by doing an iterative calculation. The encoder may adjust (260) $QP_{nom}$ and $\phi_{ref}$ accordingly. The adjusted $QP_{nom}$ and $\phi_{ref}$ may then be used in the next iteration to calculate each segment frame's $QP_{frame}$ in order to move the segment's actual bit rate closer to the target bit rate.

In this embodiment, both the $QP_{nom}$ and $\phi_{ref}$ may be adjusted in each iteration. In an alternate embodiment, the $QP_{nom}$ and $\phi_{ref}$ may be adjusted in alternate iterations or in any other iteration frequency or pattern in order to reach the target bit rate.

The encoder may then increment (265) the number of iterations, or passes, n.

The encoder may repeat the segment encoding at adjusted $QP_{nom}$'s and $\phi_{ref}$'s until the file size limitation is not exceeded.

If the file size limitation is not exceeded (225), the encoder may determine (230) whether the buffer underflows. The underflow may indicate that the decoder is ready to decode the next frame before that frame has completely arrived at the decoder. The encoder may simulate the decoder buffer and re-encodes segment frames to prevent underflow.

If the buffer underflows (230), the encoder may, as described above, calculate (240) the AMQP, calculate (245) the $AMQP_d$ for the next iteration based on the calculated AMQP, calculate (255) the adjustments to $QP_{nom}$ and $\phi_{ref}$, make (260) the adjustments, increment (265) the number of iterations, and repeat the segment encoding at adjusted $QP_{nom}$'s and $\phi_{ref}$'s until both the file size and the buffer conditions are satisfied.

If the buffer does not underflow (230), the encoder may determine (235) whether the GOP maximum size is exceeded. If the GOP maximum size is exceeded (235), the encoder may, as described above, calculate (240) the AMQP, calculate (245) the $AMQP_d$ for the next iteration based on the calculated AMQP, calculate (255) the adjustments to $QP_{nom}$ and $\phi_{ref}$, make (260) the adjustments, increment (265) the number of iterations, and repeat the segment encoding at adjusted $QP_{nom}$'s and $\phi_{ref}$'s until the file size, the buffer, and the GOP size conditions are satisfied.

If the file size limitation is not exceeded (225), the buffer is not in underflow (230), and the GOP maximum size is not exceeded (235), the segment is deemed successfully encoded at an appropriate video bit rate. The method may repeat for the remaining segments.

Figure 2:
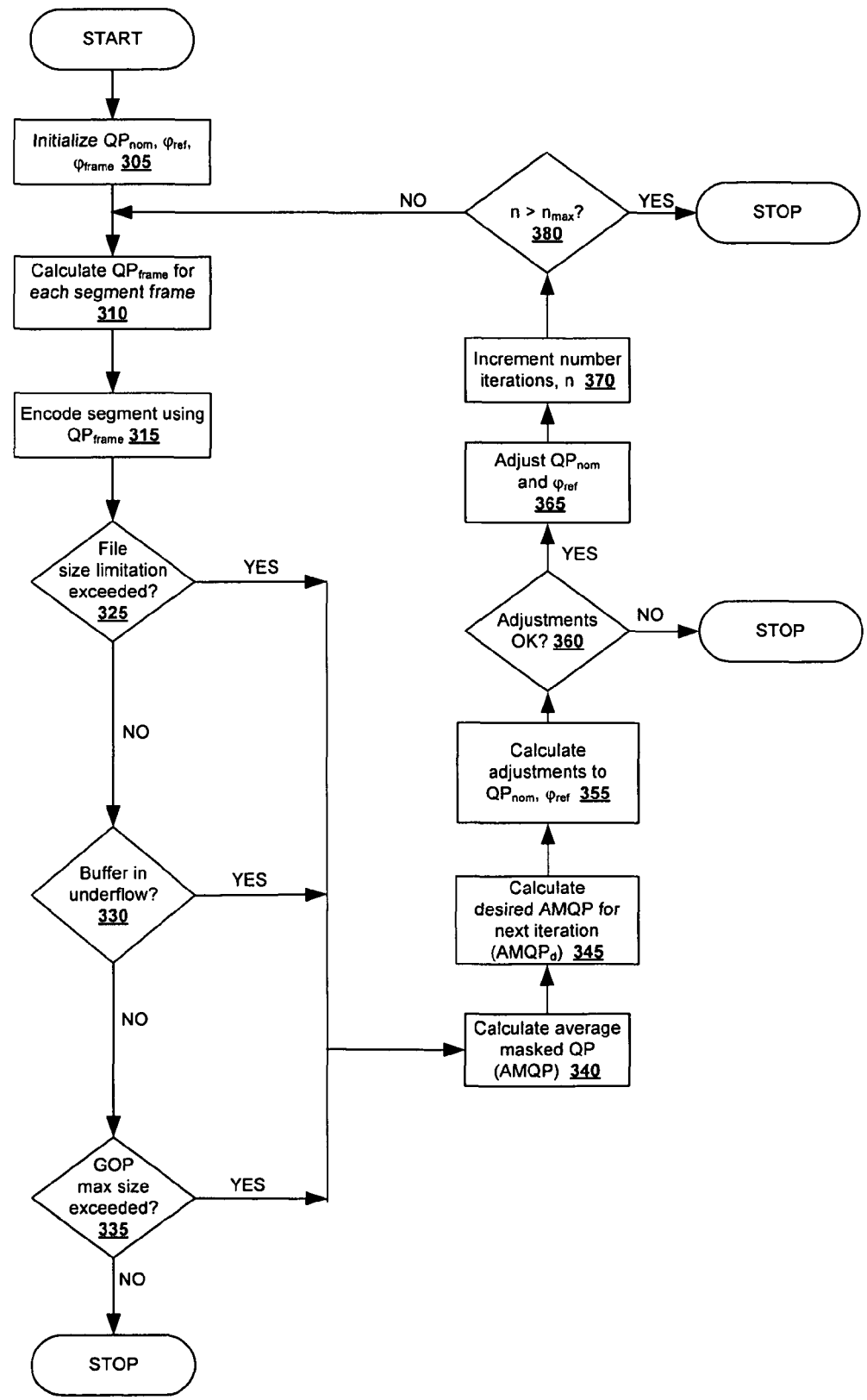
FIG. 2 is a flowchart of another method according to an embodiment of the present invention for controlling video bit rates with limitations on the method.

FIG. 2 is a flowchart of another method according to an embodiment of the present invention for controlling video bit rates with the following limitations on the method. The number of iterations n may be limited to avoid infinite iterations. Or the ranges of $QP_{nom}$ and $\phi_{ref}$ may be limited to prevent unreasonable values and/or adjustments.

The encoder may initialize (305) $QP_{nom}$, $\phi_{ref}$, $\phi_{frame}$ by setting initial values for $QP_{nom}$ and $\phi_{ref}$ and by measuring an initial value for $\phi_{frame}$. The encoder may calculate (310) each segment frame's $QP_{frame}$ based on $QP_{nom}$ and the difference between $\phi_{ref}$ and $\phi_{frame}$. The encoder may then encode (315) the segment frames using respective calculated $QP_{frame}$'s.

After the segment has been encoded, the encoder may check whether any of the above-described three undesirable conditions have occurred as a result of the encoding.

The encoder may determine (325) whether the encoded segment causes the file size limitation that was set for the entire video sequence to be exceeded. If the file size limitation is exceeded (325), the encoder may calculate (340) the AMQP. The encoder may calculate (345) the $AMQP_d$ based on the calculated AMQP. The encoder may then calculate (355) adjustments to $QP_{nom}$ and $\phi_{ref}$.

In this embodiment, the encoder may then determine (360) whether the calculated adjustments are valid, i.e., within an appropriate range. If not, the encoder may stop encoding this segment and accept the segment as encoded in the previous iteration at its bit rate.

If, however, the adjustments are valid (360), the encoder may adjust (365) $QP_{nom}$ and $\phi_{ref}$ accordingly. The adjusted $QP_{nom}$ and $\phi_{ref}$ may then be used in the next iteration to calculate each segment frame's $QP_{frame}$ in order to move the segment's actual bit rate closer to the target bit rate. The encoder may increment (370) the number of iterations, or passes, n.

In this embodiment, if the number of iterations exceeds (380) a maximum, $n_{max}$, the encoder may stop encoding this segment and accept the segment as encoded in the previous iteration at its bit rate.

If, however, the number of iterations has not exceeded the maximum (380), the encoder may repeat the segment encoding at adjusted $QP_{nom}$'s and $\phi_{ref}$'s until the file size limitation is not exceeded.

If the file size limitation is not exceeded (325), the encoder may determine (330) whether the buffer underflows. If the buffer underflows (330), the encoder may, as described above, calculate (340) the AMQP, calculate (345) the $AMQP_d$ for the next iteration based on the calculated AMQP, calculate (355) the adjustments to $QP_{nom}$ and $\phi_{ref}$, determine (360) whether the calculated adjustments are valid, make (365) the adjustments, increment (370) the number of iterations, determine (380) whether the number of iterations has not exceeded a maximum, and repeat the segment encoding at adjusted $QP_{nom}$'s and $\phi_{ref}$'s until both the file size and the buffer conditions are satisfied.

If the buffer does not underflow (330), the encoder may determine (335) whether the GOP maximum size is exceeded. If the GOP maximum size is exceeded (335), the encoder may, as described above, calculate (340) the AMQP, calculate (345) the $AMQP_d$ for the next iteration based on the calculated AMQP, calculate (355) the adjustments to $QP_{nom}$ and $\phi_{ref}$, determine (360) whether the calculated adjustments are valid, make (365) the adjustments, increment (370) the number of iterations, determine (380) whether the number of iterations has not exceeded a maximum, and repeat the segment encoding at adjusted $QP_{nom}$'s and $\phi_{ref}$'s until the file size, the buffer, and the GOP size conditions are satisfied.

If the file size limitation is not exceeded (325), the buffer is not in underflow (330), and the GOP maximum size is not exceeded (335), the segment is deemed successfully encoded at an appropriate video bit rate. The method may repeat for the remaining segments.

In this embodiment, the adjustments are made based on segment coding results. In alternate embodiments, the method may make the adjustments based on frame coding results, macroblock coding results, or a combination of both.

Figure 3:
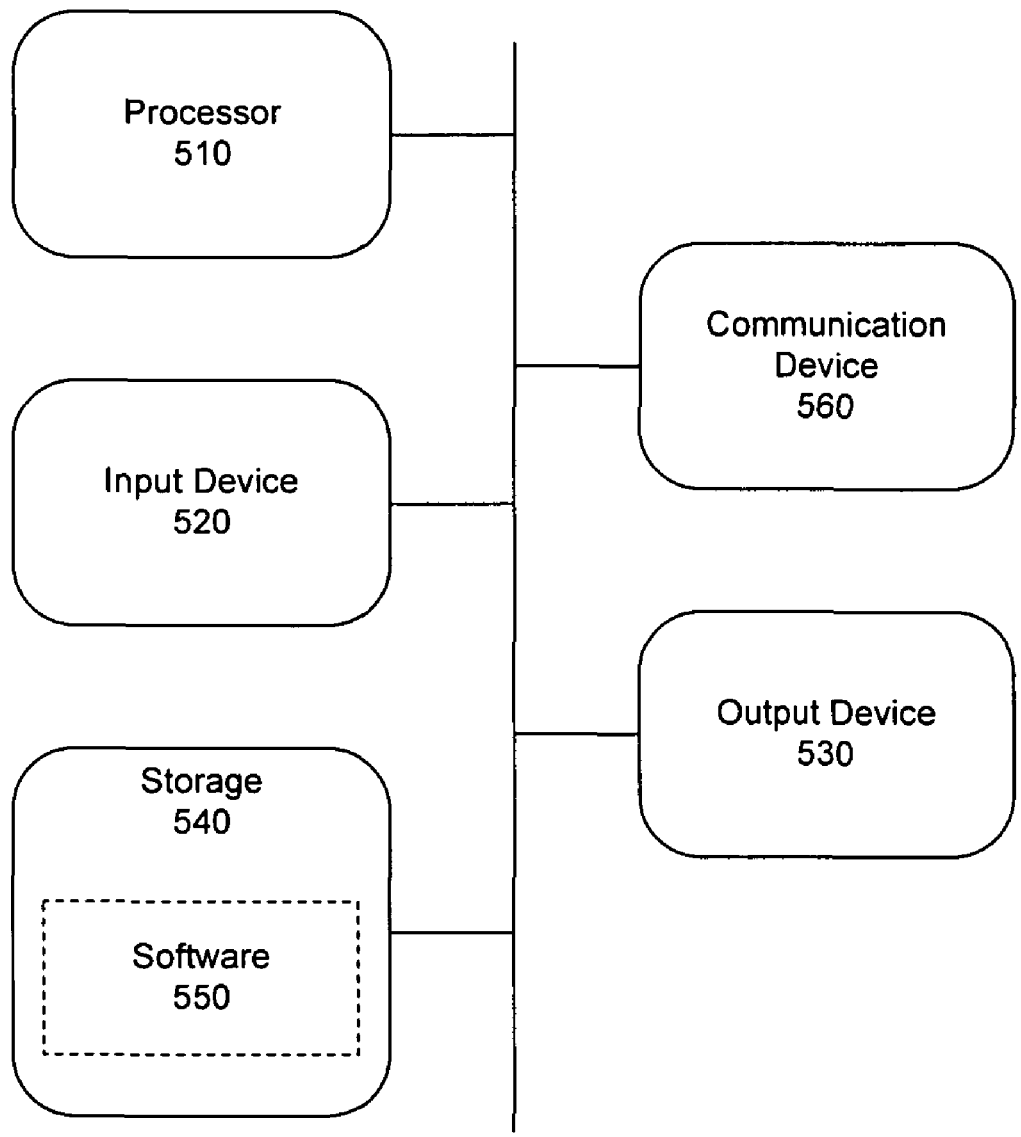
FIG. 3 illustrates a computer system upon which embodiments of the present invention may be implemented.

FIG. 3 illustrates the components of a basic computing device in accordance with an embodiment of the present invention. The computing device may be a personal computer, workstation, handheld personal digital assistant ("PDA"), or any other type of microprocessor-based device. The computing device may include one or more of processor 510, input device 520, output device 530, storage 540, and communication device 560.

Input device 520 may include a keyboard, mouse, pen-operated touch screen or monitor, voice-recognition device, or any other device that provides input. Output device 530 may include a monitor, printer, disk drive, speakers, or any other device that provides output.

Storage 540 may include volatile and nonvolatile data storage, including one or more electrical, magnetic or optical memories such as a RAM, cache, hard drive, CD-ROM drive, tape drive or removable storage disk. Communication device 560 may include a modem, network interface card, or any other device capable of transmitting and receiving signals over a network. The components of the computing device may be connected via an electrical bus or wirelessly.

Software 550, which may be stored in storage 540 and executed by processor 510, may include, for example, the application programming that embodies the functionality of the present invention.

The computing device may implement any operating system, such as Windows or UNIX. Software 550 may be written in any programming language, such as ABAP, C, C++, Java or Visual Basic. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention.

The invention claimed is:

1. A method for controlling, with an encoder, a video bit rate for encoding a video sequence, comprising:
   coding a video sequence as a plurality of Groups of Pictures (GOPs);
   iteratively adjusting with the encoder a reference quantization parameter and a reference masking strength parameter to encode the video sequence based on an estimated decoder buffer condition, and GOP size limitation of the encoded video sequence,
   stopping the adjusting with the encoder when the buffer condition and the GOP size limitation are satisfied.

2. The method of claim 1, wherein the adjusting comprises:
   encoding with the encoder, a segment of the video sequence based on the reference quantization parameter;
   determining with the encoder, whether the buffer condition is satisfied; and
   if the buffer condition is not satisfied,
      adjusting with the encoder, the reference quantization parameter, and
      repeating the encoding and the determining at the adjusted reference quantization parameter until the buffer condition is satisfied.

3. The method of claim 1, wherein the adjusting comprises:
   encoding with the encoder a segment of the video sequence based on the reference quantization parameter;
   determining with the encoder, whether the GOP size limitation is satisfied; and
   if the GOP size limitation is not satisfied,
      adjusting with the encoder, the reference quantization parameter, and
      repeating the encoding and the determining at the adjusted reference quantization parameter until the GOP size limitation is satisfied.

4. The method of claim 1, wherein the adjusting comprises:
   encoding with the encoder, a segment of the video sequence based on the reference masking strength parameter;
   determining with the encoder, whether the buffer condition is satisfied; and
   if the buffer condition is not satisfied,
      adjusting with the encoder, the reference masking strength parameter, and
      repeating the encoding and the determining at the adjusted reference masking strength parameter until the buffer condition is satisfied.

5. The method of claim 1, wherein the adjusting comprises:
   encoding with the encoder, a segment of the video sequence based on the reference masking strength parameter;
   determining with the encoder, whether the GOP size limitation is satisfied; and
   if the GOP size limitation is not satisfied,
      adjusting with the encoder, the reference masking strength parameter, and
      repeating the encoding and the determining at the adjusted reference masking strength parameter until the GOP size limitation is satisfied.

6. The method of claim 1, wherein the adjusting comprises:
   encoding with the encoder, a segment of the video sequence based on the reference quantization parameter and the reference masking strength parameter;
   determining with the encoder, whether the buffer condition is satisfied; and if the buffer condition is not satisfied,
adjusting with the encoder, the reference quantization parameter and the reference masking strength parameter, and
repeating the encoding and the determining at the adjusted reference quantization parameter and the adjusted reference masking strength parameter until the buffer condition is satisfied.

7. The method of claim 1, wherein the adjusting comprises:
encoding with the encoder, a segment of the video sequence based on the reference quantization parameter and the reference masking strength parameter;
determining with the encoder, whether the GOP size limitation is satisfied; and
if the GOP size limitation is not satisfied,
adjusting with the encoder, the reference quantization parameter and the reference masking strength parameter, and
repeating the encoding and the determining at the adjusted reference quantization parameter and the adjusted reference masking strength parameter until the GOP size limitation is satisfied.

8. The method of claim 1, wherein the adjusting comprises:
determining with the encoder, the buffer condition and the GOP size limitation.

9. The method of claim 1, wherein the buffer condition indicates that the buffer is in underflow.

10. The method of claim 1, wherein the GOP size limitation indicates that the GOP maximum size has been exceeded.

11. The method of claim 1, wherein the stopping comprises:
stopping the adjusting with the encoder, if the number of iterations exceeds a maximum number or if the reference quantization parameter after adjustment exceeds a predetermined value or if the amount of the adjustment of the reference quantization parameter exceeds a predetermined amount.

12. The method of claim 1, wherein the stopping comprises:
stopping the adjusting with the encoder, if the reference masking strength parameter after adjustment exceeds a predetermined value or if the amount of the adjustment of the reference masking strength parameter exceeds a predetermined amount.

13. The method of claim 1, wherein the stopping comprises:
stopping the adjusting with the encoder, if a target video bit rate is reached.

14. The method of claim 1, wherein the adjusting comprises:
iteratively adjusting with the encoder, the reference quantization parameter and the reference masking strength parameter after the encoding of each frame of the video sequence or after the encoding of at least one macroblock of each frame of the video sequence.

15. The method of claim 1 wherein the reference quantization parameter and the reference masking strength parameter are set by the encoder, distinct from a quantization parameter and a masking strength parameter calculated by the encoder based on image content of the sequence.

16. The method of claim 1, further comprising:
iteratively adjusting with the encoder, the reference quantization parameter based on a predetermined file size limitation of the video sequence.

17. The method of claim 16, wherein the adjusting based on the predetermined file size limitation comprises:
encoding with the encoder, a segment of the video sequence based on the reference quantization parameter;
determining with the encoder, whether the predetermined file size limitation is satisfied; and
if the predetermined file size limitation is not satisfied,
adjusting with the encoder, the reference quantization parameter, and
repeating the encoding and the determining at the adjusted reference quantization parameter until the predetermined file size limitation is satisfied.

18. The method of claim 16, wherein the adjusting based on the predetermined file size limitation comprises:
encoding with the encoder, a segment of the video sequence based on the reference masking strength parameter;
determining with the encoder, whether the predetermined file size limitation is satisfied; and
if the predetermined file size limitation is not satisfied,
adjusting with the encoder, the reference masking strength parameter, and
repeating the encoding and the determining at the adjusted reference masking strength parameter until the predetermined file size limitation is satisfied.

19. An encoder for controlling video bit rate, comprising:
an input device to receive a video sequence;
a processor to:
code the video sequence as a plurality of Groups of Pictures (GOPs),
iteratively adjust a reference quantization parameter and a reference masking strength parameter for encoding the video sequence based on a decoder buffer condition and a GOP size limitation of the encoded video sequence, and
encode the video sequence based on the adjusted reference quantization parameter and the adjusted reference masking strength parameter, an output device to send the encoded video sequence to the decoder.

20. The encoder of claim 19, wherein the processor is to stop adjusting the reference quantization parameter and the reference masking strength parameter when the buffer condition and the GOP size limitation are satisfied.

21. The encoder of claim 19, wherein the processor is to adjust the reference quantization parameter and the reference masking strength parameter after encoding each frame of the video sequence or after encoding at least one macroblock of each frame of the video sequence.

* * * * *